US010043194B2

(12) United States Patent
Baughman et al.

(10) Patent No.: US 10,043,194 B2
(45) Date of Patent: Aug. 7, 2018

(54) NETWORK DEMAND FORECASTING

(71) Applicant: INTERNATIONAL BUSINESS MACHINES CORPORATION, Armonk, NY (US)

(72) Inventors: Aaron K. Baughman, Silver Spring, MD (US); James R. Kozloski, New Fairfield, CT (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 801 days.

(21) Appl. No.: 14/245,594

(22) Filed: Apr. 4, 2014

(65) Prior Publication Data

US 2015/0287057 A1    Oct. 8, 2015

(51) Int. Cl.
*G06Q 10/00* (2012.01)
*G06Q 30/02* (2012.01)

(52) U.S. Cl.
CPC .................. *G06Q 30/0202* (2013.01)

(58) Field of Classification Search
CPC ................................ G06Q 30/0202
See application file for complete search history.

(56) References Cited

U.S. PATENT DOCUMENTS

| 6,782,499 | B2 | 8/2004 | Osada et al. |
| 7,093,143 | B2 | 8/2006 | Ito et al. |
| 7,141,883 | B2 | 11/2006 | Wei et al. |
| 7,161,828 | B2 | 1/2007 | Cummings et al. |
| 7,254,797 | B2 | 8/2007 | Garlepp |
| 8,571,467 | B2 | 10/2013 | Uusitalo et al. |
| 8,578,028 | B2 | 11/2013 | Grigsby et al. |
| 8,612,599 | B2 | 12/2013 | Tung et al. |
| 8,621,080 | B2 | 12/2013 | Iyoob et al. |
| 2004/0220900 | A1* | 11/2004 | Yang ............... G06Q 10/10 |

(Continued)

FOREIGN PATENT DOCUMENTS

| CA | 2401057 | 9/2001 |
| CN | 102135914 A | 7/2011 |

(Continued)

OTHER PUBLICATIONS

Owayedh, M.S., et al., "Identification of Temperature and Social Events Effects on Weekly Demand Behavior", IEEE, 2000, pp. 2397-2402.

(Continued)

*Primary Examiner* — Jonathan G Sterrett
(74) *Attorney, Agent, or Firm* — William H. Hartwell; Andrew M. Calderon; Roberts Mlotkowski Safran Cole & Calderon, P.C.

(57) ABSTRACT

Approaches for predicting demand spikes and cyclic demand for web-related content is provided. An approach includes generating multiple models for predicting demand. The approach further includes selecting a model from the multiple models. The approach further includes inputting information into the model. The approach further includes generating, by at least one computing device, a predicted demand spike using the model and the information. The approach further includes generating a total predicted demand curve by combining the predicted demand spike with predicted cyclical demand.

20 Claims, 12 Drawing Sheets

(56) References Cited

U.S. PATENT DOCUMENTS

| | | | |
|---|---|---|---|
| 2005/0240668 A1* | 10/2005 | Rolia | H04L 67/325 709/223 |
| 2006/0218278 A1* | 9/2006 | Uyama | G06Q 10/04 709/226 |
| 2007/0118421 A1* | 5/2007 | Oku | G06Q 10/04 705/7.31 |
| 2008/0270329 A1* | 10/2008 | Long | G06K 9/6256 706/12 |
| 2008/0273591 A1* | 11/2008 | Brooks | H04N 7/1675 375/240.01 |
| 2009/0265707 A1 | 10/2009 | Goodman et al. | |
| 2010/0185768 A1* | 7/2010 | Hamedany | H04N 21/23116 709/226 |
| 2011/0112441 A1 | 5/2011 | Burdea | |
| 2011/0119226 A1* | 5/2011 | Ruhl | G06F 17/3089 706/52 |
| 2012/0005148 A1 | 1/2012 | Horvitz et al. | |
| 2012/0311657 A1 | 12/2012 | Boldyrev et al. | |
| 2012/0329384 A1 | 12/2012 | Boldyrev et al. | |
| 2013/0073490 A1 | 3/2013 | Baughman et al. | |
| 2013/0086431 A1 | 4/2013 | Arndt et al. | |
| 2013/0219067 A1 | 8/2013 | Boss et al. | |
| 2013/0254374 A1 | 9/2013 | Bogdany et al. | |
| 2013/0263019 A1 | 10/2013 | Castellanos et al. | |
| 2013/0273959 A1 | 10/2013 | Wu et al. | |
| 2013/0275961 A1 | 10/2013 | Anderson et al. | |
| 2013/0290542 A1 | 10/2013 | Watt et al. | |
| 2013/0290598 A1 | 10/2013 | Fiske et al. | |
| 2013/0311626 A1* | 11/2013 | Karthikeyan | H04L 41/0816 709/221 |
| 2014/0006377 A1 | 1/2014 | Astore | |
| 2014/0040883 A1 | 2/2014 | Tompkins | |
| 2014/0047272 A1 | 2/2014 | Breternitz et al. | |
| 2014/0053226 A1 | 2/2014 | Fadida et al. | |
| 2014/0055458 A1 | 2/2014 | Bogdany et al. | |
| 2014/0059226 A1 | 2/2014 | Messerli et al. | |
| 2014/0079297 A1 | 3/2014 | Tadayon et al. | |
| 2014/0165063 A1 | 6/2014 | Shiva | |

FOREIGN PATENT DOCUMENTS

| | | |
|---|---|---|
| CN | 102385719 A | 3/2012 |
| CN | 103036974 | 4/2013 |
| CN | 103095533 | 5/2013 |
| CN | 103220365 A | 7/2013 |
| CN | 103577268 | 2/2014 |
| WO | 2001080158 | 10/2001 |
| WO | 201310262 | 1/2013 |
| WO | 201339555 A1 | 3/2013 |

OTHER PUBLICATIONS

Weinman, J., Time is money: the value of "on-demand", JoeWeinman.com, Jan. 7, 2011, 30 pages.

Weng, Y., et al., "Price spike forecasting using concept-tree approach based on cloud model", IEEE, 2009, Abstract.

Tirado, J.M., et al., "Predictive Data Grouping and Placement for Cloud-Based Elastic Server Infrastructures", IEEE, 2011, Abstract.

Paris, J.F., et al., "Delayed Chaining: A Practical P2P Solution for Video-on-Demand", IEEE, 2012, Abstract.

Jiu, R., et al., "A predictive judgment method for WLAN attacking based on cloud computing environment", IEEE, 2010, Abstract.

Lagar-Cavilla, H.A., et al., "SnowFlock: Virtual Machine Cloning as a First-Class Cloud Primitive", ACM Transactions on Computer Systems (TOCS) Journal, 2011, 51 pages.

Terzis, A.. et al., "Wireless Sensor Networks for Soil Science", International Journal of Sensor Networks, vol. 7, Issue 1/2, Feb. 2010, 18 pages.

Office Action dated Dec. 4, 2015 in related U.S. Appl. No. 14/247,594, 8 pages.

Chen et al., "Parameter Selection for Sub-hyper-sphere Support Vector Machine", Department of Computer Science & Technology, Third International Conference on Natural Computation (ICNC 2007), 4 pages.

Lin-cheng Zhou et al.,"QPSO-Based Hyper-Parameters Selection for LS-SVM Regression", Fourth International Conference on Natural Computation, 2008 IEEE, 4 pages.

Jeong et al., "Adaptive response mechanism based on the hybrid simulation and optimization for the real time event management", 2009 International Conference on New Trends in Information and Service Science, 6 pages.

Deusen et al.,"The Elements of Nature:Interactive and Realistic Techniques", University of Constance, Germany, Article 32, Jan. 2004. 406 pages.

Abraham et al.,"Survey of Spatio-Temporal Databases", Advanced Computing Research Centre, School of Computer and Information Science, University of South Australia,1999 Kluwer Academic Publishers, Boston, 39 pages.

Ullah et al., "Fuzzy Monte Carlo Simulation using point-cloud-based probability-possibility transformation", The Society for Modeling and Simulation International (SCS), vol. 89 Jul. 2013, 17 pages.

Babu et al.,Recovery and visualization of 3D structure of chromosomes from tomographic reconstruction images, EURASIP Journal of Applied Signal Processing, vol. 2006, Article ID 45684, 13 pages.

Zhou et a.,"Data-Parallel Octrees for Surface Reconstruction", IEEE Transactions on Visualization and Computer Graphics, Vol. 17, No. 5, May 2011, 13 pages.

Ruthven et al., "Constructions of dynamic geometry: A study of the interpretative flexibility of educational software in classroom practice", Computers & Education 51, 2008, 21 pages.

Raad et al.,"Achieving Sub-Second Downtimes in Internet-wide Virtual Machine Live Migrations in LISP Networks", IFIP/IEEE International Symposium on Integrated Network Management (IM2013), 8 Pages.

Chen et al.,"Fitting a Surface to 3-D Points Using an Inflating Balloon Model", Institute for Robotics and Intelligent Systems, University of Southern California,1994 IEEE, 8 pages.

Jun Zhu et al., "Twinkle: A Fast Resource Provisioning Mechanism for Internet Services", IEEE INFOCOM, 2011, pp. 802-810.

Sivadon Chaisiri et al., "Optimization of Resource Provisioning Cost in Cloud Computing", IEEE Transactions on Services Computing, Apr.-Jun. 2012, vol. 5, No. 2, pp. 164-177.

Beloglazov et al., "Adaptive Threshold-Based Approach for Energy Efficient Consolidation of Virtual Machines in Cloud Data Centers", Proceedings of the 8th International Workshop on Middleware for Grids, Clouds, and e-Science, Nov. 29-Dec. 3, 2010; 6 Pages.

Jain et al., "A Threshold Band Based Model for Automatic Load Balancing in Cloud Environment", Cloud Computing in Emerging Markets (CCEM), 2013, pp. 1-7.

Rak et al., "Cloud-based Concurrent Simulation at Work: Fast Performance Prediction of Parallel Programs", IEEE 21st International WETICE, 2012, pp. 137-142.

Janiesch et al., "Business Activity Management for Service Networks in Cloud Environments", M W4SOC, Dec. 12, 2011; 6 Pages.

Antonescu et al., "Dynamic SLA Management with Forecasting Using Multi-Objective Optimization", Communication and Distributed Systems (CDS) Research Group, 7 Pages.

Davidson, "Beyond Fun: Serious Games and Media", ETC Press, 2008; 199 Pages.

Bonebakker, "Finding Representative Workloads for Computer System Design", 2007; 292 Pages.

Erik Blasch et al., "Information Fusion in a Cloud-Enabled Environment" "Approved for Public Realease; Distribution Unlimited: 88ABW-2013-1114, Mar. 8, 2013", 25 pages.

Bontcheva et al.,"GATECIoud.net: a platform for large-sclae,open-source text processing on the cloud" Phil. Trans.R Soc. A 2013371,20120071, Dec. 10, 2012, 14 pages.

Cai et al.,"A Cognitive Platform for Mobile Cloud Gaming", Cloud computing Technology and Science(CloudCom), 2013 IEEE 5th International Conference vol. 1, Publication Year 2013, pp. 72-79.

Georgakopoulos et al.. "Cognitive cloud-oriented wireless networks for the Future Internet"... Wireless Communications and Networking Conference Workshops (WCNCW). 2012 IEEE. pp. 431-435.

(56) References Cited

OTHER PUBLICATIONS

Jivanadham, L.B. et al.,"Cloud Cognitive Authenticator (CCA): A public cloud computing authentication mechanism", Informatics, Electronics & Vision (ICIEV), 2013 International Conference on May 17-18, 2013, pp. 1-6.

Wang et al., "Optimizing the cloud platform performance for supporting large-scale cognitive radio networks", Wireless Communications and Networking Conference (WCNC), 2012 IEEE Apr. 1-4, 2012, 3255-3260 pages.

Chun-Hsien et al.,"Cooperative spectrum sensing in TV White Spaces: When Cognitive Radio meets Cloud", Computer Communications Workshops (INFOCOM WKSHPS), 2011 IEEE Conference on Apr. 10-15, 2011, 672-677 pages.

Park et al.,"Cognitive cryptography plugged compression for SSLTLS-based cloud computing services", Journal ACM Transactions on Internet Technology (TOIT), vol. 11 Issue 2, Dec. 2011.

Lewis et al.,"Opportunities in cloud computing for people with cognitive disabilities: designer and user perspective", UAHCI'11 Proceedings of the 6th international conference on Universal access in human-computer interaction: users diversity—vol. Part II pp. 326-331.

Höyhtyä et al.,"Cognitive engine: design aspects for mobile clouds", CogART '11 Proceedings of the 4th International Conference on Cognitive Radio and Advanced Spectrum Management Article No. 32.

Specification and Drawings "Network Demand Forecasting" for U.S. Appl. No. 16/000,183, filed Jun. 5, 2018, 57 pages.

"List of IBM Patents or Patent Applications Treated as Related" 1 page.

\* cited by examiner

NETWORK DEMAND FORECASTING

TECHNICAL FIELD

The present invention generally relates to predicting data demand, and more particularly, to predicting demand spikes and cyclic demand for web-related content.

BACKGROUND

Websites can use computing resources (e.g., servers on a cloud computing system) to store content and various functionalities of the website. Thus, when consumers (e.g., users on their smart-phones, laptops, etc.) make a request for content or to perform a function on the website, the website utilizes the computing resources to provide the requested content and/or functionalities. For example, during a golf tournament event, consumers may visit an event sponsored website to request content about a golfer. The requested information is then sent to a website server which stores the requested content and sends the requested content back to the consumer's device.

As a result, websites can experience fluctuations in content demand before, during, and after the event, such as a professional sporting tournament. The fluctuations in data/content demand from the websites can result in having too few or too many computing resources provisioned for the demand fluctuations at any given time. The demand fluctuations can be based on average amount of data demand per day and/or number of hits, i.e., each time a customer visits a website.

SUMMARY

In a first aspect of the invention, a method includes generating multiple models for predicting demand. The method further includes selecting a model from the multiple models. The method further includes inputting information into the model. The method further includes generating, by at least one computing device, a predicted demand spike using the model and the information. The method further includes generating a total predicted demand curve by combining the predicted demand spike with predicted cyclical demand.

In another aspect of the invention, there is a computer program product for predicting demand. The computer program product includes a computer usable storage medium having program code embodied in the storage medium. The program code is readable/executable by a computing device to input, by the computing device, information into a model for predicting website data demand. The computer program product includes generating, by the computing device, a predicted demand spike using the model. The computer program product includes generating, by the computing device, a total predicted demand curve by combining the predicted demand spike with predicted cyclical demand. The computer program product includes allocating, by the computing device, computing resources based on the total predicted demand curve.

In a further aspect of the invention, a system for predicting demand of networked computing resources comprises a CPU, a computer readable memory and a computer readable storage medium. Additionally, the system includes one or more program instructions. The program instructions are operable to select a model from multiple models based on the model having the lowest level of error. Program instructions are operable to input information into the model. The information is historical and online information associated with an event that generates demand. Program instructions are operable to generate a predicted demand spike using the model. Program instructions are operable to generate a total predicted demand curve by combining the predicted demand spike with predicted cyclical demand. Program instructions are operable to allocate computing resources based on the total predicted demand curve. The program instructions are stored on the computer readable storage medium for execution by the CPU via the computer readable memory.

In another aspect of the invention, a method for deploying a system for predicting demand spikes in a networked computing environment comprises providing a computer infrastructure being operable to provide the functionality of the present invention as described in any combination of features described below and/or shown in the figures.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
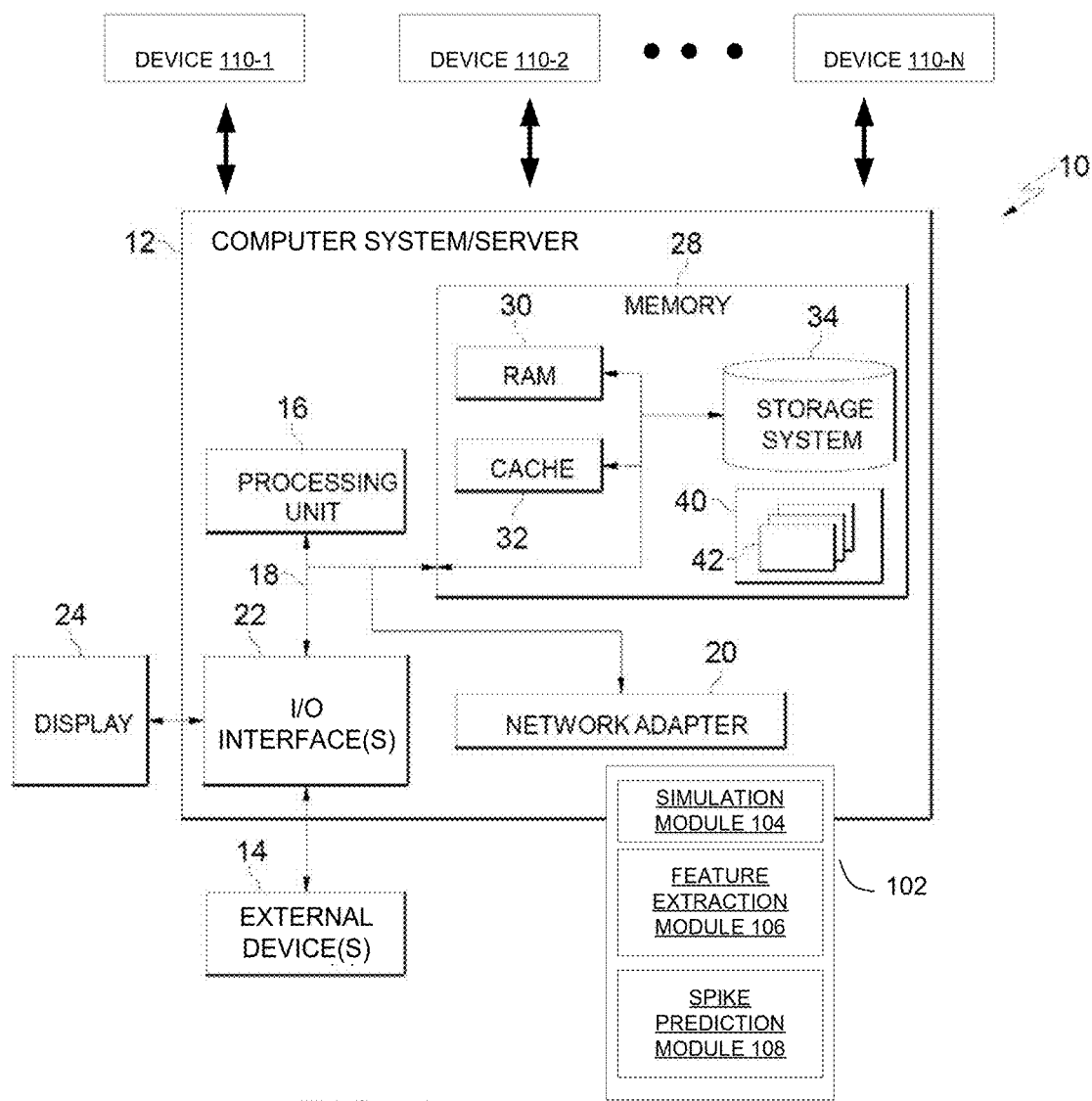
FIG. 1 is an example environment for implementing the steps in accordance with aspects of the present invention.

The present invention generally relates to predicting data demand, and more particularly, to predicting demand spikes and cyclic demand for web-related content. In embodiments, the present invention provides for modeling future demand fluctuations for website content by dynamically combining different types of demand, such as cyclic and spike demand curves. In embodiments, the modeling uses historical information as well as online (i.e., current/present) information. Accordingly, the present invention can: (i) provide cyclic demand modeling with ensembles of forecasters and pre/post processors tuned for sports or other events; (ii) provide spike demand modeling with event domain dependent and social independent pipelines using data at rest and in motion; and (iii) provide a dynamic sliding window that changes the combination of cyclic and spike based on previous error rates.

Forecasting future cloud demand is a very difficult problem given the uncertainty of user affinity of content. The present invention allows for some of the demand to be modeled by cyclic algorithms while other demand types modeled are spikes. Aspects of the invention may also take into consideration that each demand type changes during the course of an event so the demand types can be altered over a sliding window.

In embodiments, a cyclic demand can be defined as a demand over a period of time associated with one or more types of analysis, such as maximum demands, minimum demands, average demands, etc., at points of time within the period of time. In embodiments, spikes in demand (also referred to as a demand spike) can be defined as a curve that occurs within a period of time associated with the cyclic demand. For example, if a cyclic demand curve is from 10:00 a.m. to 3:00 p.m., the demand spike may occur at 2:45 p.m. and last for 45 seconds.

In embodiments, the present invention uses training and testing data to build different models (e.g., linear, quadratic, cubic, etc.), compares the different models and then selects a model with the lowest level of error (i.e., the highest level of accuracy). In embodiments, historical and online (e.g., current) information is then inputted into the model. The information can be associated with different features of the event (e.g., golf tournament, tennis tournament, etc.), such as player popularity, particular group of players, etc. In embodiments, the model can also include weights to each different feature described within the model. In embodiments, each feature is assigned to a variable that is used within the model.

In embodiments, the output of the model is a predicted level of website data demand based on all of the different variables in the model. The output of the model may then be used to determine a demand spike during a particular portion of the event. The demand spike may be used to predict how much computing resources are needed to meet the demand spike, which provides for targeted provisioning of computing resources based on the predicted demand. In embodiments, the selected model, over time, can then be updated with additional historical and online information which results in updated demand spike predictions. Thus, a computing supply curve is determined which leads to an actual demand curve and followed by a continuously updated predicted demand curve that can be used to allocate computing resources (e.g. memory, disk space, processor units, etc.) in a networked system.

As a result, by generating a model to predict demand spikes, the present invention ensures that a level of computing resources can be provisioned to meet the anticipated data demand to prevent an unsustainable volume of user traffic based on content demands from consumers. Accordingly, the present invention allows for a system of devices, e.g., cloud based digital platform delivery system, a computer network, a server network, etc., to provide a threshold level of available computing resources to meet content/data demand associated with a website. Thus, the present invention can provide: (i) long, medium, and short term forecasting; (ii) social based forecasting; (iii) sporting or other event domain dependent factors; (iv) combination of time varying cyclic forecasting and event based predictions; and (v) predictive provisioning on a three-site cloud.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPU).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Moreover in accordance with aspects of the invention, program/utility 40 can include programming instructions to provide functionality of forecasting module 102, e.g., the processes described herein. Event forecasting module 102 can be implemented as one or more program code in program/utility 40 stored in memory 28 as separate or combined modules. Additionally, event forecasting module 102 may be implemented as separate dedicated processors or a single or several processors or has dedicated program instructions to provide the function to these tools. In embodiments, event forecasting module 102 predicts website data demand by using one or more modules such as simulation module 104, feature extraction module 106, and spike prediction module 108 as separate or combined modules as implemented by program/utility 40. In embodiments, simulation module 104 receives the inputs to create a simulation; feature extraction module 106 extracts information based on the created simulation; and spike prediction module 108 generates a predicted demand in spike based on the extracted information.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In embodiments, devices 110-1, 110-2, . . . , 110-N (hereinafter referred to as device 110 in the singular and devices 110 in the plural) can request information/content relating to an event from server 12. Device 110 can be a laptop, desktop computer, smart-phone, tablet, and/or any other computing device capable of viewing web page content and/or receiving and/or sending web page content, textual messages, and/or other types of information from other devices.

In embodiments, device 110 can request information/content for an event (e.g., a live event, such as a golf tournament) from a website that is hosted by one or more website servers. For example, a user may use device 110 to find information about a particular participant (e.g., statistics—win/loss percentages, points scored, total cash prizes over a period of time, age, etc.) within the event. Thus, when the user sends the request from device 110, there may be other devices 110 requesting information at the same time from the website server(s).

In embodiments, the requests for information can also be sent to server 12, and event forecasting engine 102 can use the requests along with historical information within a model to predict future website demands. In embodiments, the model may include multiple variables associated with different features of the event. For example, the model may include a variable associated with predicting website demand for a tennis tournament's final match. The model may use historical information about different participants within the tournament (e.g., win-loss records, wins on grass vs. clay, etc.) to predict the final two players. The model may use historical and current information that is data-mined from other sources (e.g., social network sites, messaging sites, etc.) that indicate popularity of a player based on the number of times the player or event or other type of information is mentioned by name. Thus, the model can predict how many hits an event sponsored website will receive if those players or other players or event or other type of information are in the final match.

Additionally, or alternatively, the model can include other variables, such as predicting how many hits an event sponsored website will receive if there is a web exclusive event featuring a particular player. With the predicted demand, the model can then derive a demand spike which is then used to allocate a level of computing resources (e.g., 10 servers, 100 servers, 200 servers, etc.) based on the predicted demand. As a result, event forecasting engine 102 allocates computing resources for future data/information demands based on the current data/information demands to the website, historical information, and information demands made to other websites (e.g., social networking websites). In embodiments, event forecasting engine 102 can use one more modules to generate the model, such as simulation module 104, feature extraction module 106, and spike prediction module 108.

In embodiments, simulation module 104 receives input information (e.g., via I/O device 28) that determines the parameters of a particular window in time to predict data demand spikes during an event. For example, simulation module 104 may receive an input that a simulation is to be performed for the next 30 minutes.

In embodiments, feature extraction module 106 extracts information for one or more features within a model, based on parameters provided by simulation module 104. In embodiments, feature extraction module 106 extracts (e.g., data-mines the information) historical and online information from multiple information sources. For example, feature extraction module 106 may send a request or automatically receive data from a social networking website server. The data may be associated with a particular event (e.g., golf tournament) and/or the data may be associated with many different subjects (e.g., tournaments, movies, video games, etc.) which may result in extraction module 106 extracting information associated with a particular variable.

In embodiments, spike prediction module 108 uses the extracted information to predict a demand spike during the window of time as provided to simulation module 104. In embodiments, spike prediction module 108 can also generate a value (e.g., maximum value of the demand spike). In embodiments, event forecasting engine 102 may send the predicted demand spike information to other devices and/or modules that are associated with predicting cyclic demand. In embodiments, the cyclic and spike demands are combined (e.g., vectors for each type of demand are added) to provide a forecast of demand during the particular window of time during the event. An example of combining the cyclic and spike demands is further described in FIG. 5 and also in FIG. 12.

Figure 2:
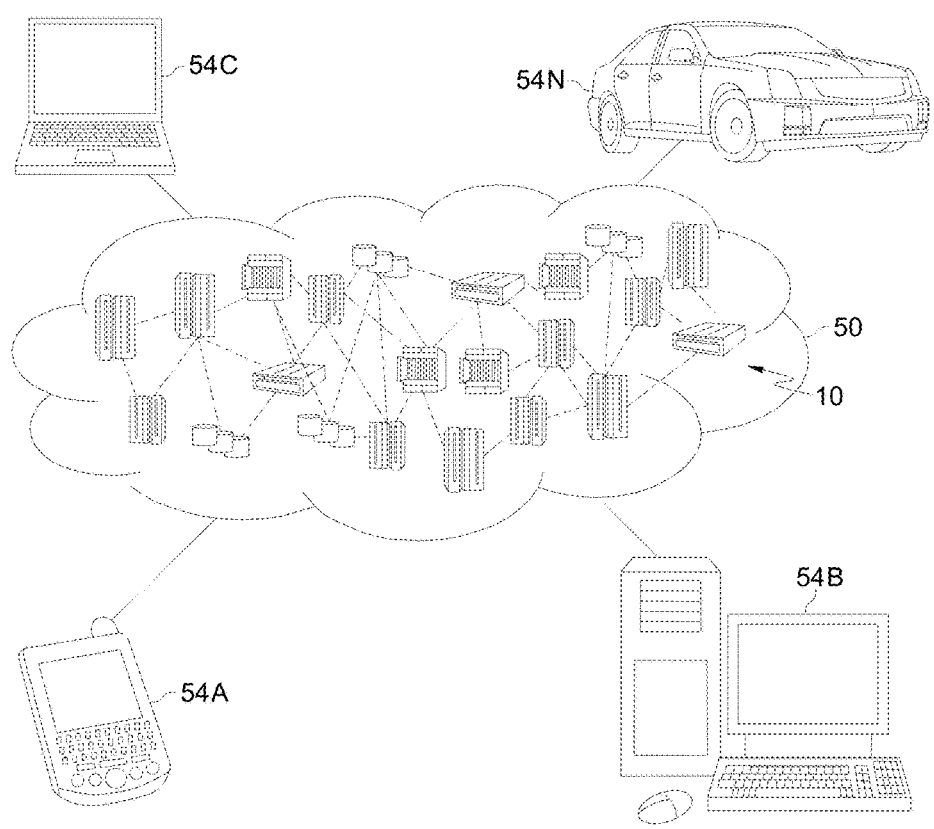
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
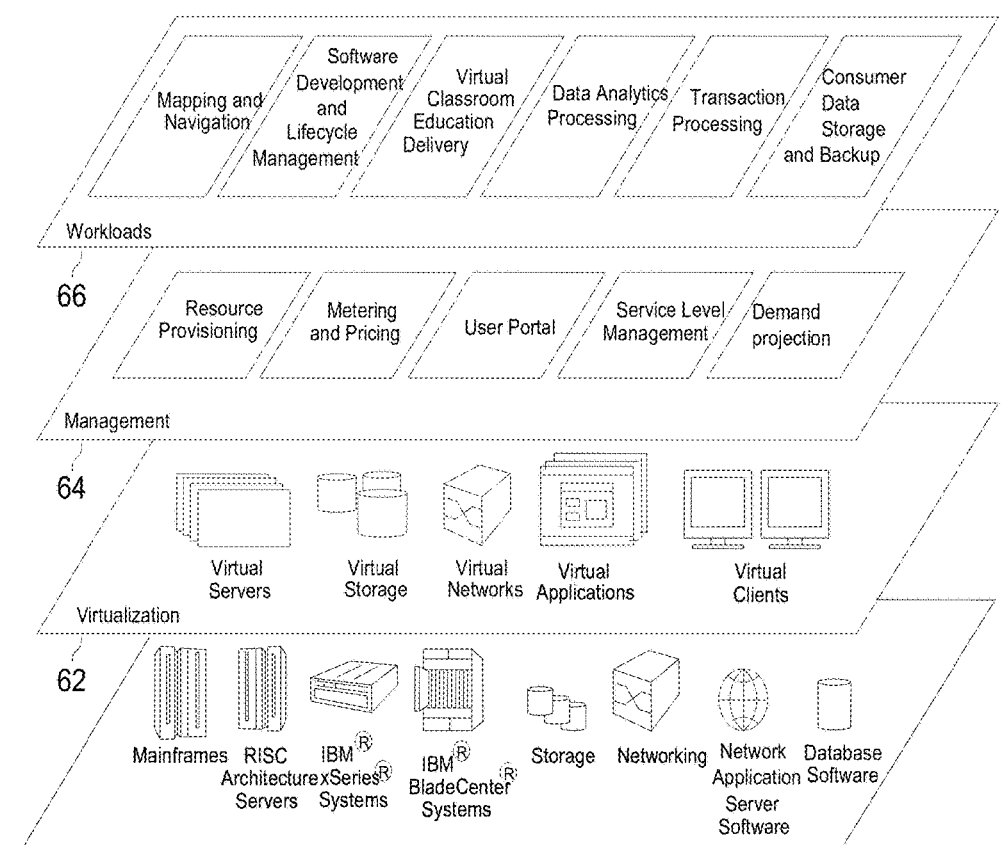
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. In accordance with aspects of the invention, the demand projection workload/function operates to perform one or more of the processes of event forecasting engine 102 described herein.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and user data backup.

As will be appreciated by one skilled in the art, aspects of the present invention, including event forecasting engine 102 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
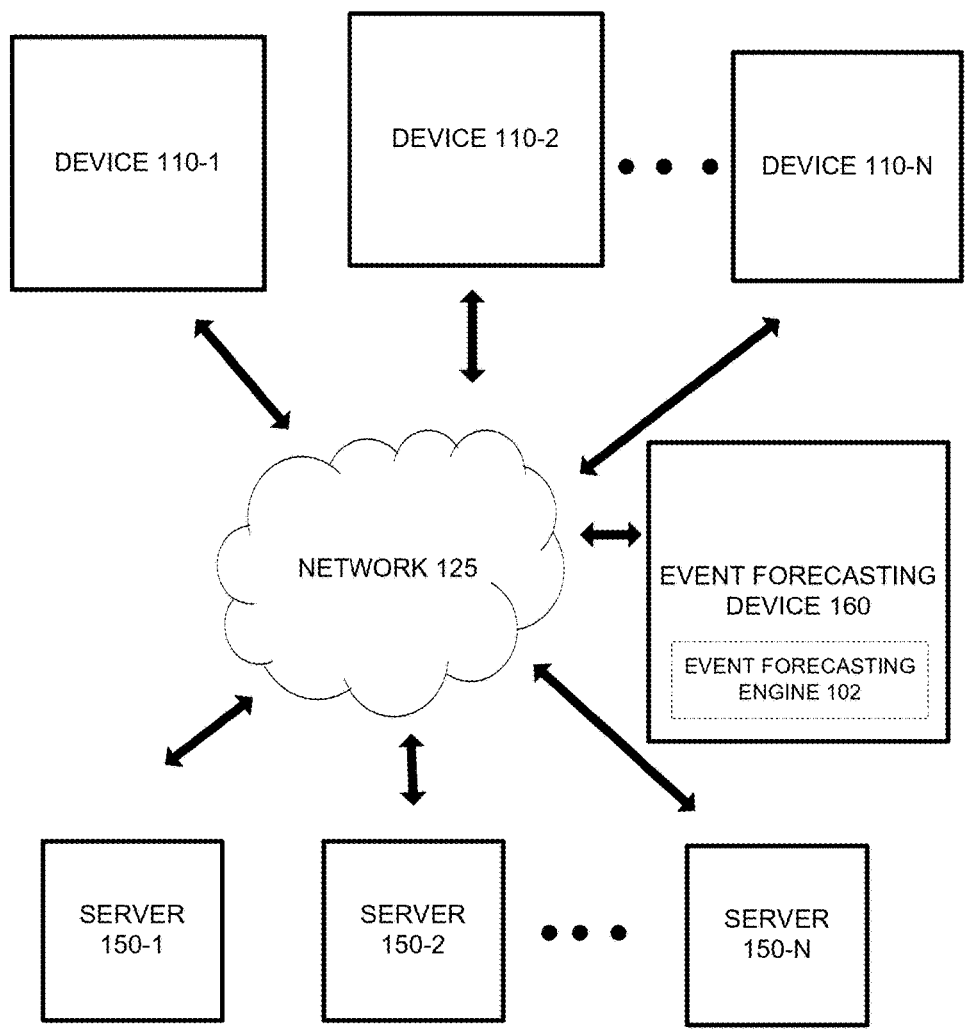
FIG. 4 is an example network diagram in accordance with aspect of the present invention.

FIG. 4 shows an example network diagram in accordance with aspects of the invention. FIG. 4 shows devices 110-1, 110-2, . . . , 110-N, network 125, servers 150-1, 150-2, . . . , 150-N (hereinafter referred to as server 150 in the singular and servers 150 in the plural) and event forecasting device 160. While FIG. 4 shows a particular quantity of each type of device and/or network, there may be additional or fewer devices, servers, and/or networks. In embodiments, network 125, servers 150, and/or event forecasting device 160 can be part of cloud computing environment 50 as described in FIG. 2.

In this example, devices 110 may include any computation or communication device that is capable of communicating with a network (e.g., network 125). For example, devices 110 can be similar to devices 54A-N shown in FIG. 2, and may include a laptop, desktop computer, smart-phone, tablet, or any other type of computing device. Accordingly, devices 110 can receive and/or display content, which can include, for example, objects, data, images, audio, video, text, and/or links to files accessible via one or more networks. Devices 110 can request content/information from website servers (e.g., server 150) regarding a particular event (e.g., a sporting event, a political event, a charitable event, etc.). Based on current requests from devices 110, the website servers may send current request information to event forecasting device 160 which can predict future data demands from devices 110 as discussed in greater detail in FIGS. 5-12.

Network 125 may correspond to network 50 of FIG. 2, and may include one or more networks that allow for communication between different devices (e.g., devices 110, event forecasting device 160, etc.). In embodiments, network 125 can comprise the Internet, an intranet, local area network (LAN), wide area network (WAN), a GPS network, radio access network, a wireless fidelity (Wi-Fi) network, a Worldwide Interoperability for Microwave Access (Wi-MAX) network, a cellular network, and/or a combination of these or other networks.

Servers 150 may include any computation or communication device that is capable of communicating with a network (e.g., network 125). In embodiments, servers 150 can provide data and information to event forecasting device 160. For example, servers 150 can be associated with social networking systems, text messaging systems, websites, content providers (e.g., television, music, movies, etc.) and/or any other system that can provide data/information. Thus, servers 150 can be servers used to host websites about events, servers that can be a part of a cloud network (such as described in FIGS. 2-3), servers that provide services to social networking websites, and/or servers that can be provisioned on an as-needed basis based on demand predictions by event forecasting device 160.

Event forecasting device 160 can include one or more computational devices that can allocate the computing resources (e.g., memory, processing units, etc.) to meet the predicted demand for content/information from devices 110, as described in FIG. 1. In embodiments, event forecasting device 160 can include event forecasting engine 102 (as described in FIG. 1) to predict demand. Additionally, event forecasting device 160 can be a part of computer/system server 12 also described in FIG. 1 and/or a cloud computing node 10 as described in FIG. 1. In embodiments, event forecasting device 160 can receive data/information from servers 150 and extract information that can be used to generate a model to predict data demand. Furthermore, event forecasting device 160 can use current data/content demands from devices 110 in combination with historical information and information from servers 150 to predict future demand. Once event forecasting device 160 predicts a demand, event forecasting device 160 may provision one or more computing devices within a cloud computing environment (e.g., described in FIG. 2) based on event forecasting engine 102 using one or more modules as described in FIG. 1.

Flow Charts

Figure 5:
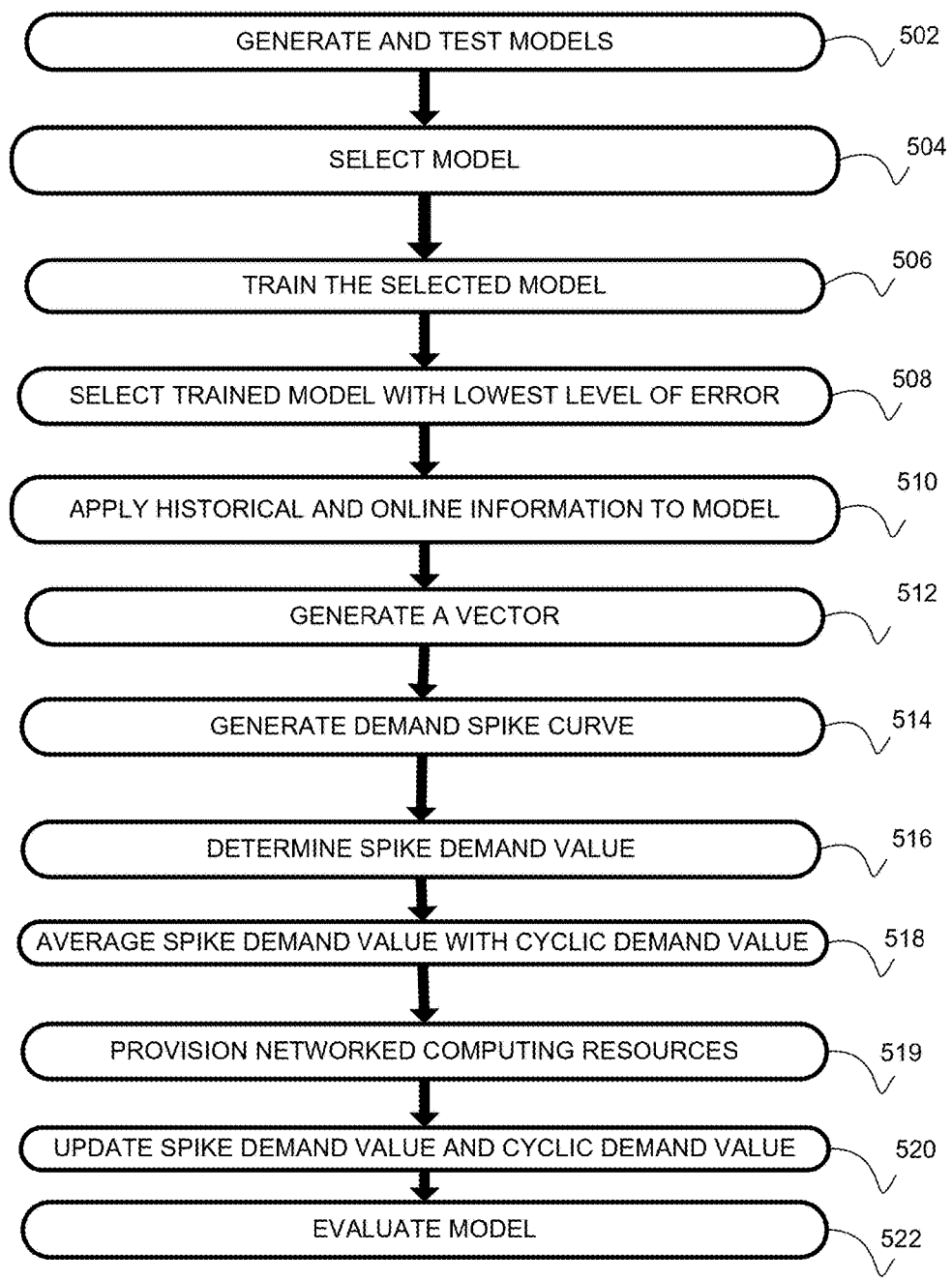
FIGS. 5-6 show example flows in accordance with aspects of the present invention.
Figure 6:
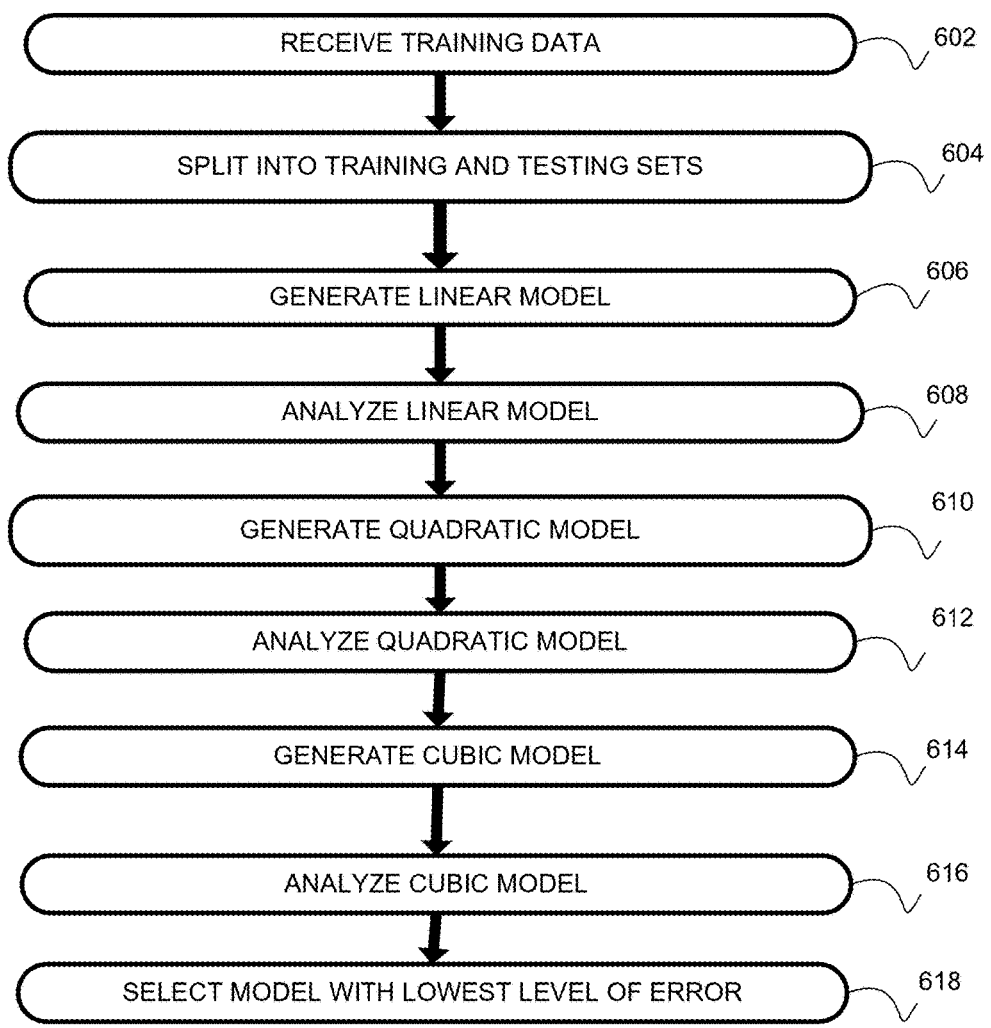

FIGS. 5-6 show example flows for predicting data demands on a computing system in accordance with aspects of the present invention. The steps of FIGS. 5-6 may be implemented in one or more of the environment of FIGS. 1, 2, 3, and 4 for example.

FIG. 5 is an example flow for predicting demand for an event in accordance with aspects of the present invention. In embodiments, an event forecasting device predicts a demand based on one or more event-related features that will generate hits to a website before, during, and/or after the event. For example, in a golf tournament, the event-related features may be particular golfers, a hole (e.g., the ninth hole, the eighteenth hole, etc.), popularity of a golfer, the proximity to lead, etc., that result in consumers visiting the event-related website.

At step 502, an event forecasting device (e.g., event forecasting device 160 running event forecasting engine 102 as described in FIG. 4) generates and tests different models that can be used to predict website data demands. In embodiments, the event forecasting device can generate different models (e.g., linear, quadratic, cubic, etc.) and then test the models for levels of accuracy as further described in FIG. 6 which defines how the models are generated and tested.

At step 504, the event forecasting device selects one of the models. In embodiments, the event forecasting device selects a model, generated in step 502, with the lowest level of error as described in greater detail in FIG. 6.

At step 506, the event forecasting device trains the selected model. In embodiments, the event forecasting device trains the selected model by boosting the model, bagging the model, and/or performing any other training method to the model. In embodiments, bagging the model includes: (i) generating a number (e.g., 10, 20, 30, etc.) of models; (ii) for each model use different data and generate outputs; and (iii) average the outputs. In embodiments, boosting the model includes: (i) amplifying the level of error for the model; (ii) generating a delta (i.e., a difference) between the amplified level of error and the target value; (iii) determining whether the delta is greater than a standard deviation; (iv) back propagating with a Newton-Raphson and/or any other method used for determining values (i.e., zero values) of a real-valued function; and (v) generating an output. Thus, during training, outputs of the selected model can be compared to actual values and the model can be changed (e.g., new variables, different weights, different constants) until the selected model outputs values that are within a threshold margin of error to actual values. Accordingly, the selected model is trained to output a particular range of values.

At step 508, the event forecasting device selects the model with the lowest level of error that occurs by either using the reference model (e.g., the selected model as described in step 504), the boosted model, and/or the bagged model. In embodiments, if the reference model has a level of accuracy that is equal to a model that has gone through boosting and/or bagging, the reference model is selected since the additional resources associated with boosting and/or bagging do not improve the level of accuracy.

At step 510, the event forecasting device applies historical and online information to the model. In embodiments, the historical information can be related to similar events, such as past tennis matches (e.g., number of players, number of people who visited event-related websites during the event, past popularity levels of players, winners of the tournament, etc.). In embodiments, the online information can be related to current data demand associated with the event related website and other websites (e.g., number of people demanding information from a social network about a particular player, number of people mentioning a player's name on a messaging website, etc.) and/or demands to the event-related website at the current time.

At step 512, the event forecasting device generates a total vector. In embodiments, the total vector defines all the features extracted and that are associated with variables within the model. As such, the total vector can be a summation of individual vectors associated with different variables for different features. In embodiments, the features can be related to social domain independent pipelines (i.e., sources) of data, such as data from social networking websites; that is, independent pipelines are sources of data that are independent of the event-related/sponsored website(s). Additionally or alternatively, the features can include information from event dependent pipelines (e.g., a tennis organization that is running a tournament may have an event sponsored website). In embodiments, the different variables may all be associated with one event or may be associated with two or more events that may be occurring simultaneously.

At step 514, the event forecasting device determines a demand spike based on the vector. In embodiments, the selected model (e.g., such as a multiple linear regression model) is applied to the total vector (a future time horizon feature vector) to produce a spike curve from predicted event factors. In embodiments, the model outputs a demand spike curve that can have a Gaussian distribution as described in expression (1):

$$f(x) = ae^{-(x-\mu)^2/2\sigma^2} \quad (1)$$

As shown in expression (1), "a" is the predicted demand from the output of the model, "$\mu$" is the spike central time, and $\sigma^2$ is the spike duration. In embodiments, at every minute or time interval, a spike demand value is calculated for each spike and added on the spike curve. Thus, the short term spike curve is averaged with the longer cyclic based curve for which an example is described in FIG. 12.

At step 516, the event forecasting device uses expression (1) to determine a spike demand value. In embodiments, the event forecasting device uses the spike demand curve to calculate a spike demand value that is then assigned to the particular point in time associated with the predicted spike demand. In embodiments, a spike demand curve can be a curve that is for a period of time that occurs within a larger length of time associated with a cyclic demand curve. For example, a cyclic demand curve may describe average values for minute increments between 11:00 a.m. to 12:00 p.m.; and a spike demand curve may describe a curve that occurs between 11:43 a.m. to 11:44 a.m. In embodiments, the spike demand curve can have a maximum value that is less than, equal to, or greater than the maximum value of the cyclic demand curve.

At step 518, the event forecasting device takes the spike demand curves and averages the values with a cyclic demand curve to generate a total predicted demand curve. At step 519, the event forecasting device provisions networking computing resources (e.g., website servers, bandwidth, etc.) based on the total predicted demand curve. This may involve for example, allocating sufficient resources (e.g., website servers, etc.) for handling the predicted demand. At step 520, the event forecasting device updates the total predicted demand curve by using updated historical and online information.

In embodiments, as time moves forward (i.e., a sliding window of time), additional historical and online information is inputted into the total predicted demand curve to generate an updated output—the predicted demand. For example, if the total predicted demand curve provides a predicted demand at 11:45 a.m. based on historical and online information from 9:00 a.m. to 11:30 a.m., then the sliding window of time can use historical and online information from 11:30 a.m. to 1:30 p.m. to provide an updated output at 1:35 p.m. Thus, the updated historical and online information can alter the cyclic demand curve and the spike demand curves within the combined curve.

At step 522, the event forecasting device evaluates the model that was selected at step 506. In embodiments, the event forecasting device can generate and display graphs, tables, etc., that can be used to analyze the accuracy of the selected model, as shown in FIGS. 6-9. Furthermore, the event forecasting device can also use an updated model, based on the selected model, that includes a time based variable to determine whether the model generated outputs that met a particular threshold. In embodiments, the event forecasting device can use regression models, such as expressions (2), (3), and/or (4) to determine the success level of the selected model, during particular periods of time within the event (e.g., the determination is made every one hour):

$$X = c + \Sigma \alpha X + \varepsilon \quad (2)$$

$$X = c + \Sigma \alpha \beta X^2 + \alpha \beta X + \varepsilon \quad (3)$$

$$x = c + \Sigma \alpha \beta X^2 + \Sigma \alpha \beta X^2 + \alpha \beta X + \varepsilon \quad (4)$$

As shown in expressions (2), (3), and (4), a is the weight associated with the amount of time being analyzed in the past and β is the weight associated to particular variable X; furthermore, c can be a constant value and ε can be an error value. In embodiments, the weight associated with α can increase with increasing the amount of time (e.g., one hour has a greater weight than 30 minutes), or the weight associated with a can decrease with increasing the amount of time. Each expression can output an eigenvalue.

The success level can be defined as comparing the outputs of expressions (2), (3), and/or (4) with an array, matrix, range, etc., of desired outputs and determining whether the outputs correspond to the desired outputs. Thus, the rate of change of the eigenvalue output is compared to the desired outputs. If the particular regression model meets the desired output, then the model is used for another period of time within the event, such as described in step 510. If the particular regressive model does not meet the desired output, then the model is switched to another model, such as from a linear model to a quadratic model, if the other model provides outputs that correspond to the desired outputs. In embodiments, the other model is then used for a period of time and is then checked by the event forecasting device to be providing outputs that correspond to desired outputs. Thus, at a period of time within the event, the present invention analyzes a model, determines whether the model is providing desired outputs, and then either continues using the model for the next period of time or switches to another model for the next period of time.

FIG. 6 is an example flow for further defining steps 502 and 504 as shown in FIG. 5. In embodiments, the event forecasting device (e.g., event forecasting device 160 as described in FIG. 1) generates different models (e.g., linear, quadratic, cubic, etc.) and then tests each model to determine which model outputs values with the lowest level of error. Thus, the lowest level of error can be determined by comparing the predicted data demand outputs from the model and actual data demands during a particular time. In embodiments, the testing and training of the models ensures that the models do not have over-fitting or over-training issues, ensuring an independent test of the models.

At step 602, the event forecasting device receives training data. In embodiments, training data can be data sets that can be used as inputs into the model so that the model provides desired outputs. At step 604, the event forecasting device splits the training data into train and test sets (e.g., 70% training data and 30% testing data). In embodiments, test sets are data sets that are also used as inputs into the model and which provide outputs which are then compared to the outputs generated by using the training data.

At step 606, the event forecasting device generates a linear model. In embodiments, creating the linear model includes extracting different multi-variant features, which have values (multi-variant values), from a pipe of data (i.e., set of data received from other devices or services, such as data-mined information from a social networking website). In embodiments, each of the derived multi-variant values is a coefficient that is used in conjunction with a variable (e.g., the derived multi-variant value is multiplied with the variable within the linear model). In embodiments, the coefficient can be a weight that is assigned to the variable. At step 608, the event forecasting engine analyzes the linear model by applying training and testing data to the linear model.

At step 610, the event forecasting device generates a quadratic model. In embodiments, creating the quadratic model includes extracting different multi-variant features, which have values (multi-variant values), from a pipe of data (i.e., set of data received from other devices or services, such as data-mined information from a social networking website). In embodiments, each of the derived multi-variant values is a coefficient that is used in conjunction with a variable. In embodiments, the coefficient can be a weight that is assigned to the variable. At step 612, the event forecasting engine analyzes the quadratic model by applying training data to the quadratic model.

At step 614, the event forecasting device generates a cubic model. In embodiments, creating the cubic model includes extracting different multi-variant features, which have values (multi-variant values), from a pipe of data (i.e., set of data received from other devices or services, such as data-mined information from a social networking website). In embodiments, each of the derived multi-variant values is a coefficient that is used in conjunction with a variable. In embodiments, the coefficient can be a weight that is assigned to the variable. At step 616, the event forecasting engine analyzes the cubic model by applying training data to the cubic model.

At step 618, the event forecasting device selects the model with the lowest level of error by comparing the level of error of the linear model, the quadratic model, and the cubic model, generated in steps 606, 610, and 614, respectively. With the selected model, the event forecasting device performs further analysis and implementation as described in steps 510 to 522 as shown in FIG. 5.

It should be noted that for the analysis of the model in steps 608, 612, and 618, the application of training data to the linear model may require parsing. In embodiments, parsing may occur when the data is in one format (UIMA) and the linear model is in another format (e.g., predictive model markup language—PMML) and requires converting the linear model into another language, such as JAVA™ to allow the model to use the data inputs.

Figure 7:
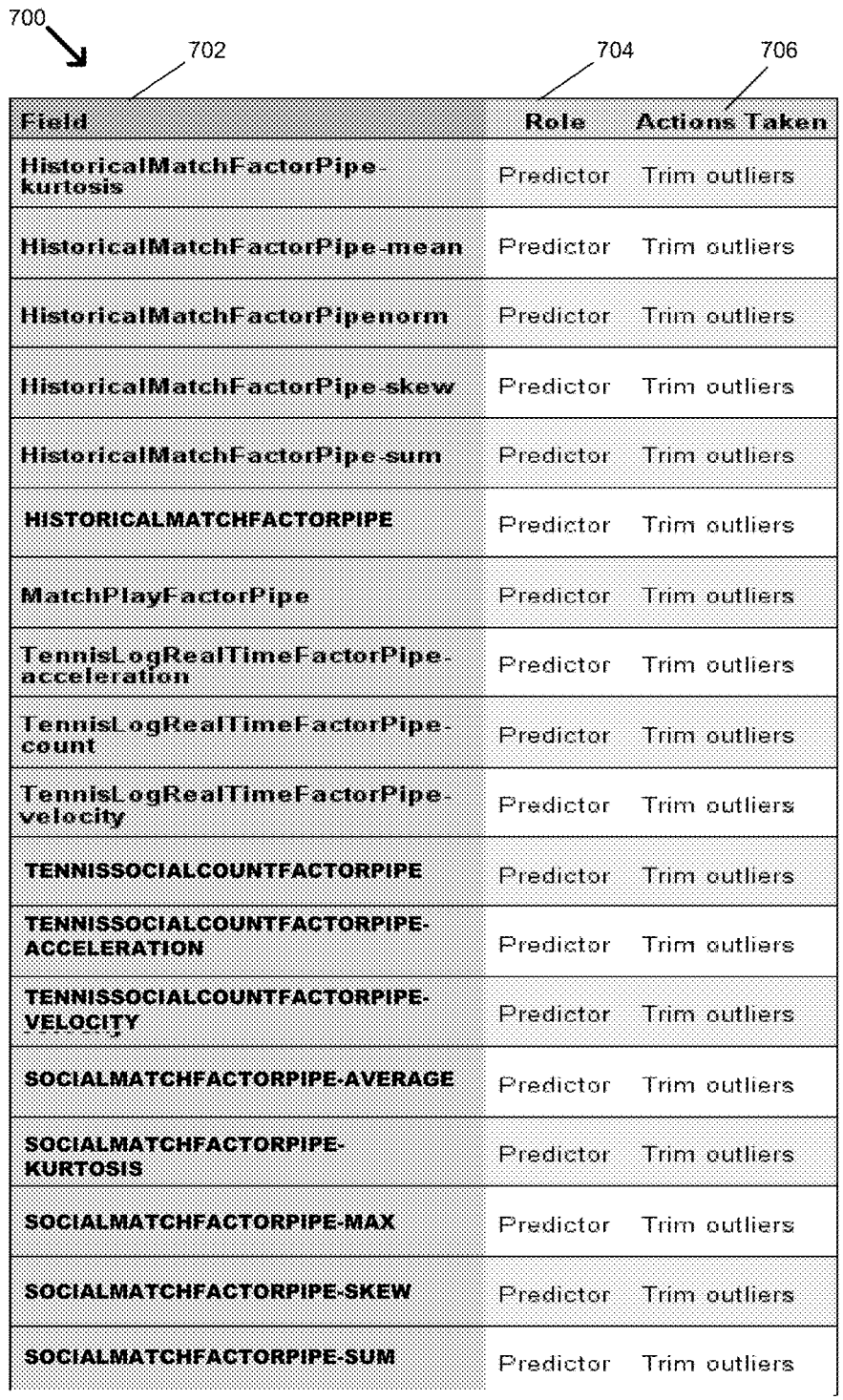
FIG. 7 shows an example table in accordance with aspects of the present invention.

FIG. 7 shows example table 700 which includes variables for multiple features that can be used within a model. In embodiments, each of the multiple features can be used within the model to determine a predicted demand spike during an event and, as such, can be used as variables within the models (e.g., the linear model, quadratic model, cubic model, etc.) described in FIGS. 5 and 6. For example, the multiple features can be variables in the selected model described in step 510 in FIG. 5. Furthermore, the multiple features can be used to determine the type of information that is extracted from the historical and online information, as described by the feature extraction module 106 in FIG. 1 and step 510 in FIG. 5. While table 700 shows a particular number of variables, table 700 can include fewer, additional, or different variables. As shown, table 700 includes field 702, role 704, and action 706. In embodiments, each variable in table 700 is sent to different parts of an event forecasting device, e.g., different devices for processing to determine cyclic demand and demand spikes. In embodiments, event forecasting device may include multiple UIMA-asynchronous scale-out (AS) devices.

In embodiments, field 702 provides a description of multiple variables. In embodiments, each variable can be defined by different descriptive terms as shown in table 700. The different terms can be altered in order and/or use other terms to define the variable. The first part of the variable defines the type of data that is being extracted from online information and/or historical information and used by the event forecasting device. For example, "HistoricalMatchFactor," defines historical match information (e.g., a tennis match in 1985). Also, for example, "MatchPlayFactor" defines a current match, either within an event within another event. The next part of the variable is "Pipe" which indicates that the data is extracted from a source of data. In embodiments, the incoming data from the "pipe" can be messaging information, logs, streaming information that has been captured from other servers associated with different services (e.g., social networking systems, content providers, messaging systems, etc.).

In embodiments, the incoming data can be provided in a format associated with UIMA. In embodiments, the source of data may be a server associated with a social network or content provider that is providing the data to the event forecasting device, either by receiving requests (e.g., pings, messages, etc.) for the event forecasting device or automatically sending information to the event forecasting device. The next part of the variable defines an action to the data. For example, "Mean" would indicate that one or more mean values are being derived from the extracted data. Accordingly, table 700 includes, and is not limited to, the following variables for use within a model:

(i) "HistoricalMatchFactorPipe-Kurtosis"—determines a predicted number of hits (i.e., requests to a website) based on the kurtosis (i.e., the height and range of the curve) of the "Historical Match Popularity Factor." In embodiments the "Historical Match Popularity Factor" can be historical information about a particular match prior to the event. In embodiments, "Pipe" indicates historical match data that has been extracted from a source (i.e., a pipeline) of incoming data.

(ii) "HistoricalMatchFactorPipe-Mean"—determines a predicted number of hits based on the mean of the "Historical Match Popularity Factor."

(iii) "HistoricalMatchFactorPipe-Norm"—determines a predicted number of hits based on the normalized value of the "Historical Match Popularity Factor."

(iv) "HistoricalMatchFactorPipe-Skew"—determines a predicted number of hits based on the asymmetry of a distribution of values associated with the "Historical Match Popularity Factor."

(v) "HistoricalMatchFactorPipe-Sum"—determines a predicted number of hits based on a summation of values associated with the "Historical Match Popularity Factor."

(vi) "HistoricalMatchFactorPipe"—determines a predicted number of hits based on a maximum value associated with the "Historical Match Popularity Factor."

(v) "MatchPlayFactorPipe"—determines a predicted number of hits based on a predicted number of hits based on a summation value of current information associated with a current match within the event.

(vi) "TennisLogRealTimeFactorPipe-Acceleration"—determines a predicted number of hits based on the acceleration of all streaming access logs for a period of time.

(vii) "TennisLogRelTimeFactorPipe-Count"—determines a predicted number of hits based on the count of all streaming access logs for a period of time.

(viii) "TennisLogRealTimeFactorPipe-Velocity"—determines a predicted number of hits based on the velocity of all streaming access logs for a window of time.

(ix) "Tennissocialcountfactorpipe"—determines a predicted number of hits based on the count of all logs, associated with mentions/discussions of a tennis match, associated with one or more social networking/messaging websites.

(x) "Tennissocialcountfactorpipe-Velocity"—determines a predicted number of hits based on the velocity of all the logs, associated with mentions/discussions of a tennis match, associated with one or more social networking/messaging websites.

(xi) "SocialMatchFactorPipe-Average"—determines a predicted number of hits based on the average number of mentions of all matches being played within an event based on discussions associated with one or more social networking/messaging websites.

(xii) "SocialMatchFactorPipe-Kurtosis"—determines a predicted number of hits based on the kurtosis of mentions of all matches being played within an event based on discussions associated with one or more social networking/messaging websites.

(xiii) "SocialMatchFactorPipe-Max"—determines a predicted number of hits based on the maximum value for mentions of all matches being played within an event based on discussions associated with one or more social networking/messaging websites.

(xiv) "SocialMatchFactorPipe-Skew"—determines a predicted number of hits based on the skew for mentions of all matches being played within an event based on discussions associated with one or more social networking/messaging websites.

(xv) "SocialMatchFactorPipe-Sum"—determines a predicted number of hits based on the sum for mentions of all matches being played within an event based on discussions associated with one or more social networking/messaging websites.

While not shown in table 700, other factors associated with online information can be included such as:

"Hole Number"—determines the predicted number of hits based on a particular hole within a golf tournament.

"Featured Hole"—determines the predicted number of hits based on a particular hole or a group of holes that are significant based on their level of play for golfers. This can include a particular part of the golf course which may, for example, include the $11^{th}$, $12^{th}$, and/or $13^{th}$ holes.

"Playoff"—determines the predicted number of hits based on a playoff between different players. A playoff is determined if both currently playing golfers, current golfers, and those who have finished their round can tie their scores. This variable can also take into account each players abilities, such as scoring an eagle or a bogey based on the hole and the course.

"Proximity to Lead"—determines the predicted number of hits based on when one or more players is within a particular threshold of the lead. If a round of golf has not been completed, then scores are predicted from historical game information until all players have 18 scores. In embodiments, statistics can be used to determine a likely group of winners who could win the tournament.

"Web Exclusive"—determines the predicted number of hits based on portions of a golf tournament that are only available online (web exclusive events). Thus, the "web exclusive" variable determines the number of hits based on when the web exclusive event occurs.

"Featured Group"—determines a predicted number of hits based on players in an event who have web accessible streaming coverage for website users.

Role 704 indicates how the variable is to be used within the model. In embodiments, the variables can be used as predictors of future demand and thus are provided the role of "predictor."

Action 706 is a field in table 700 that indicates the action that is associated with the variable defined in field 702. As shown, each variable is used as a "trim outliers" which indicates that outlying outputs beyond a particular threshold are removed (e.g., an output greater than 100,000 is not used). While FIG. 7 shows all the variables as having a "trim outliers" action, the variables can have other roles such as "do not trim outliers," or any other role that can limit the outputs associated with the variable.

Figure 8:
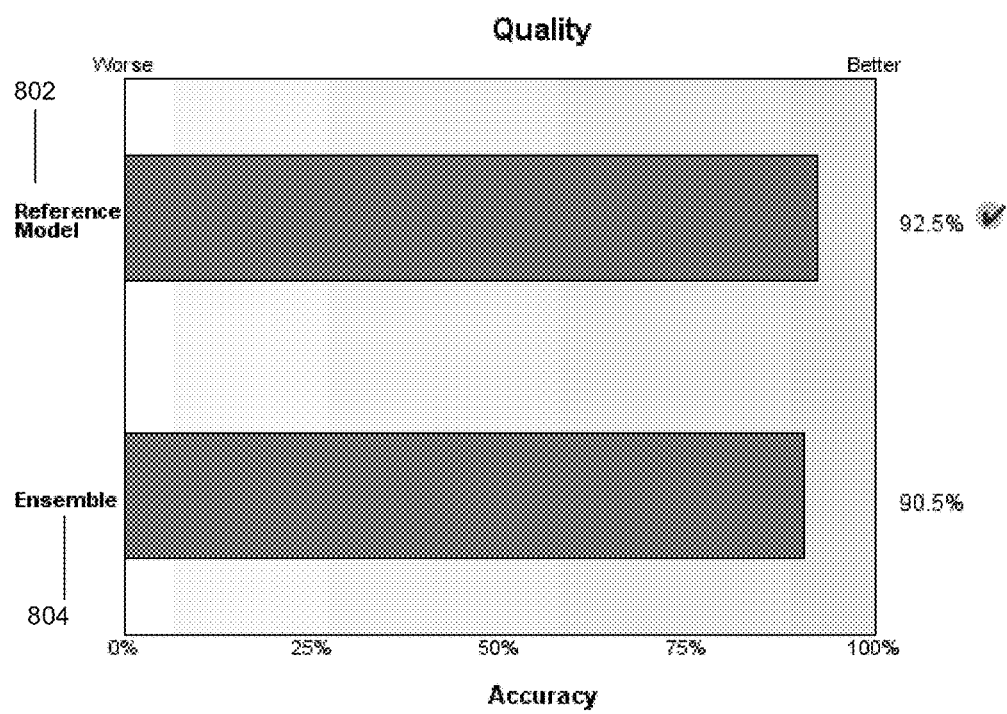
FIGS. 8-11 are example displays of analysis in accordance with aspects of the present invention.

FIG. 8 shows comparing accuracy levels between a reference model and the reference model being analyzed under a bagging technique or a boosting technique. FIG. 8 shows reference model 802 and ensemble 804. In embodiments, reference model 802 is the selected model as described in step 504 in FIG. 5. In embodiments, ensemble 804 is the model that is analyzed by using bagging and/or boosting methods. Based on analyzing the accuracy of reference model 802 and ensemble 804, the event forecasting device selects the model with the highest level of accuracy which also means the model with the lowest level of error. As shown in FIG. 8, reference model 802 is selected since it has a level of accuracy of 92.5% which is higher than the ensemble 804 having an accuracy of 90.5%.

Figure 9:
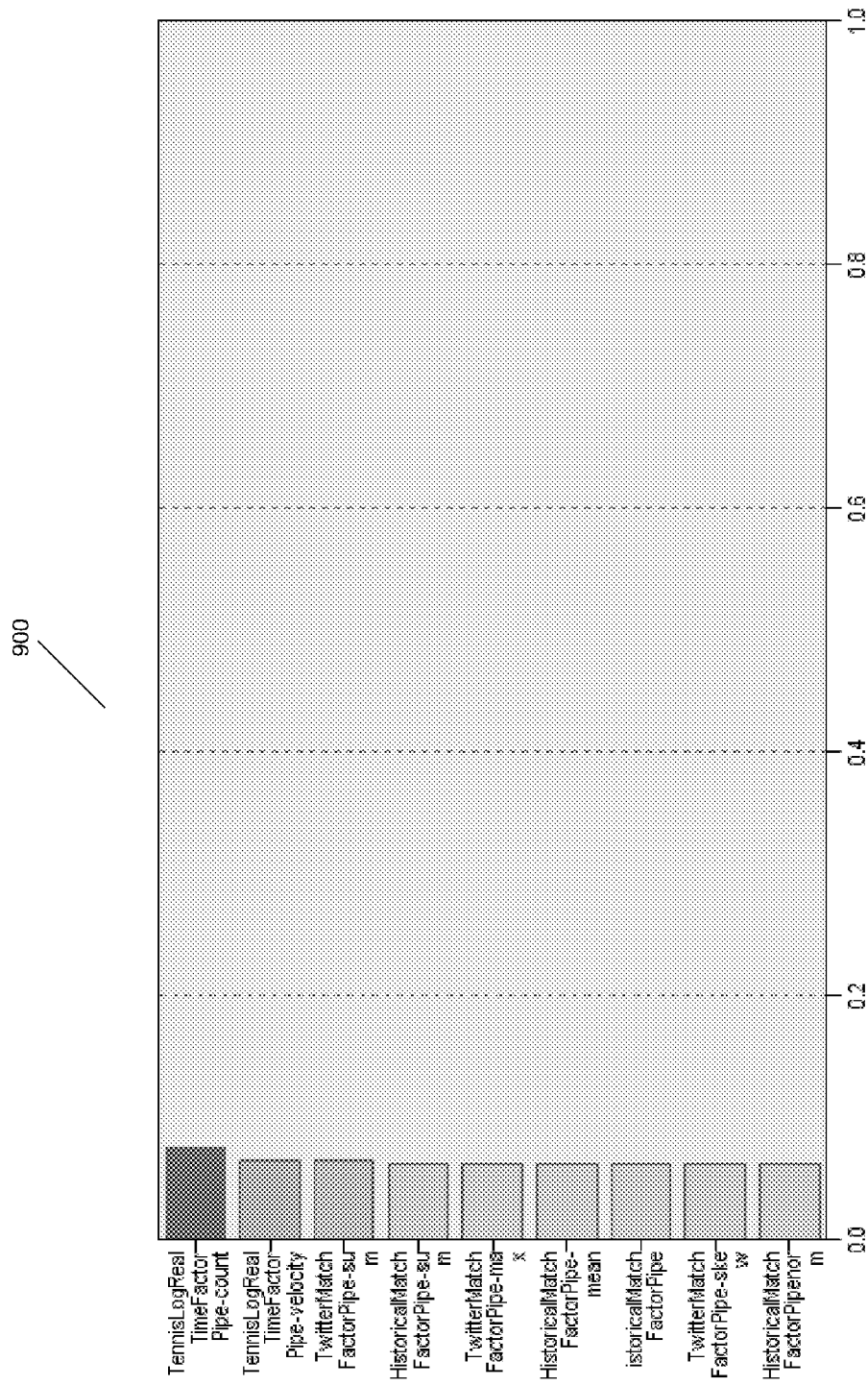

FIG. 9 shows an example graph 900 that shows predictor importance in accordance with aspects of the present invention. In embodiments, during the training and testing, described in FIGS. 5 and 6, the event forecasting device determines a hierarchy of which features have a greater weight and, hence, a greater influence on the outcome of the model. FIG. 9 shows, for example, that "TennisLogRealTimeFactorPipe-Count" has the greatest importance level. The hierarchy may be determined by analyzing a model and determining each variable's weight within the model.

Figure 10:
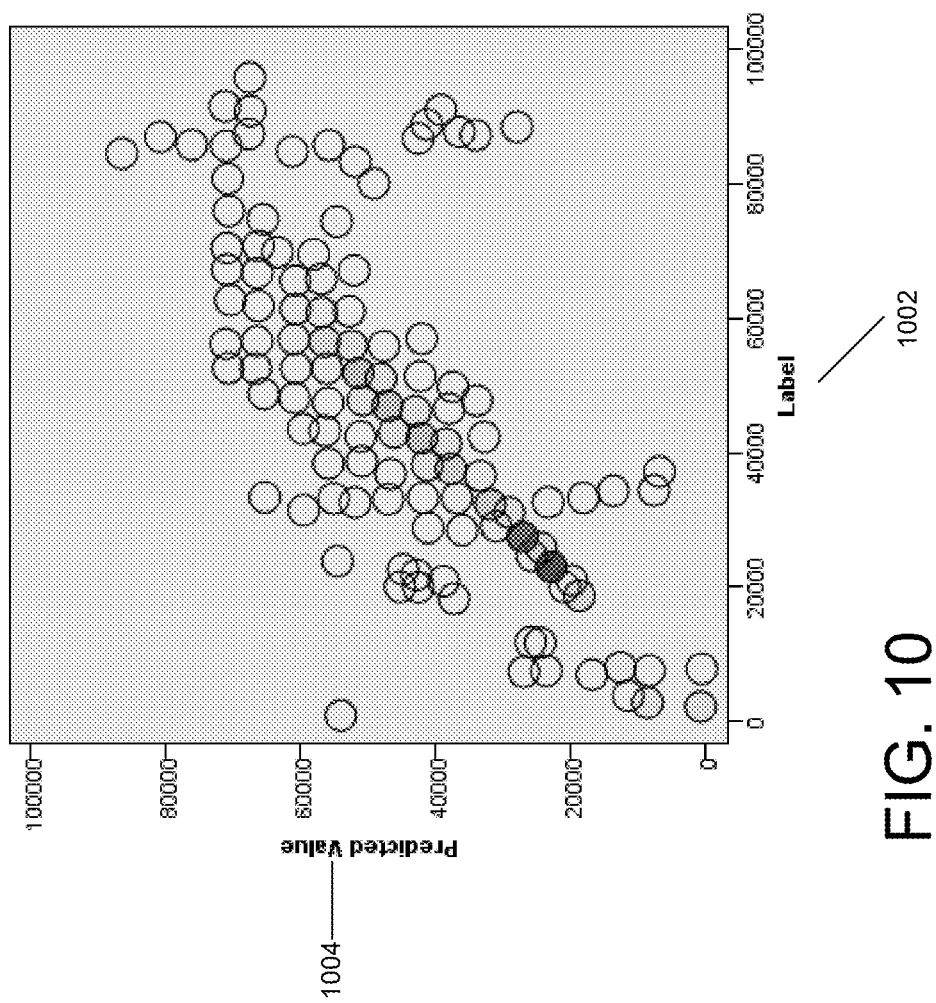

FIG. 10 shows an example graph that compares actual demand with a model's predicted output. As shown in FIG. 10, the horizontal axis is defined as Label 1002 which indicates the actual values (20,000, 40,000, 80,000, etc.) associated with the number of hits to a website (e.g., 20,000 hits). Also, as shown in FIG. 10, the vertical axis is Predicted Value 1004 which indicates the predicted values by the model.

Figure 11:
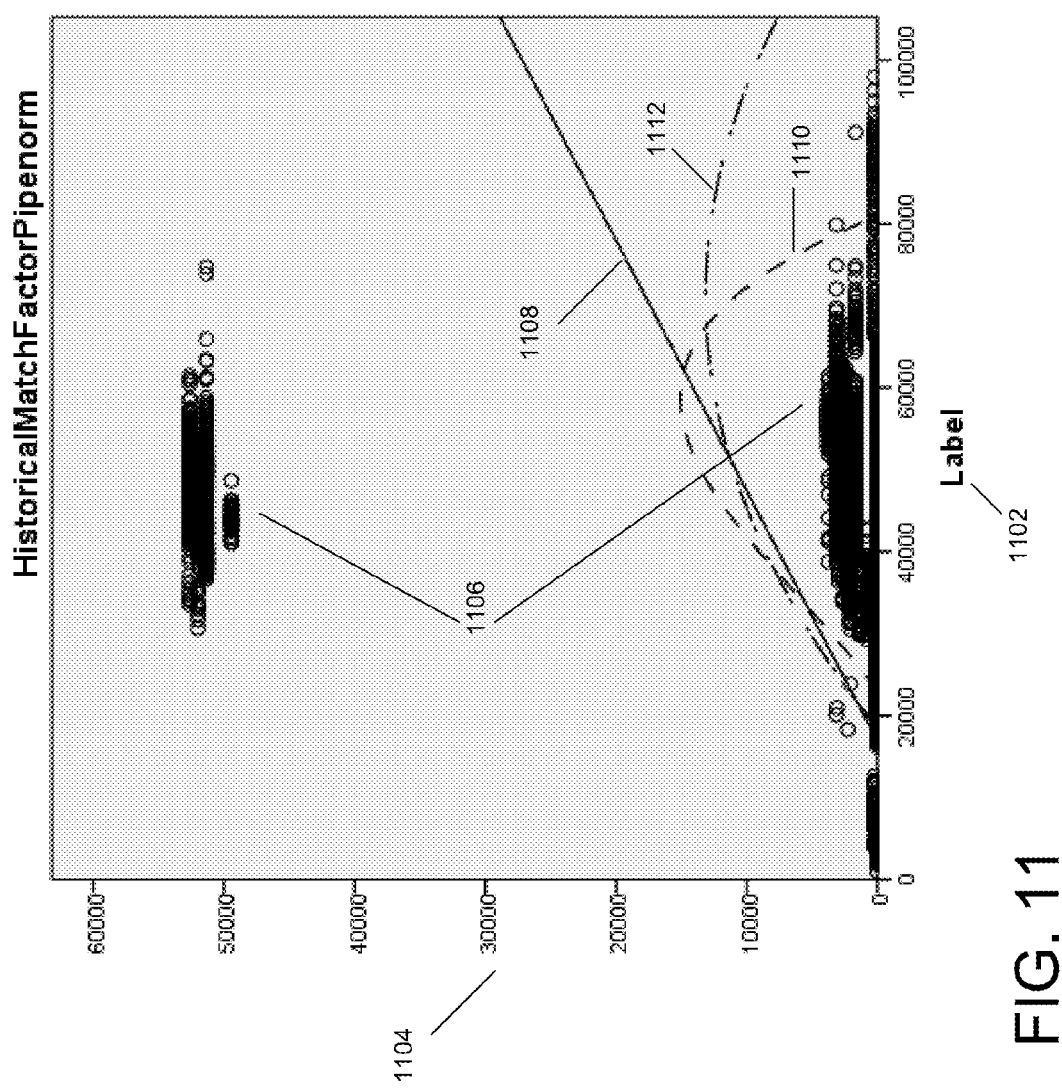

FIG. 11 shows an example graph that compares actual demand with a model's predicted output for a particular feature within the model in accordance with aspects of the present invention. For example, FIG. 11 can be for any of the features described in table 700 in FIG. 7. As shown, axis 1102 indicates values (20,000, 40,000, etc.) that are associated with predicted number of hits to a website and axis 1104 indicates the observed number of hits. Data points 1106 indicate the actual website demand values that occur at particular times, curve 1108 indicates the linear model's predicted website demand values, curve 1110 indicates the quadratic model's predicted website demand values, and curve 1112 indicates the cubic model's predicted website demand values.

Figure 12:
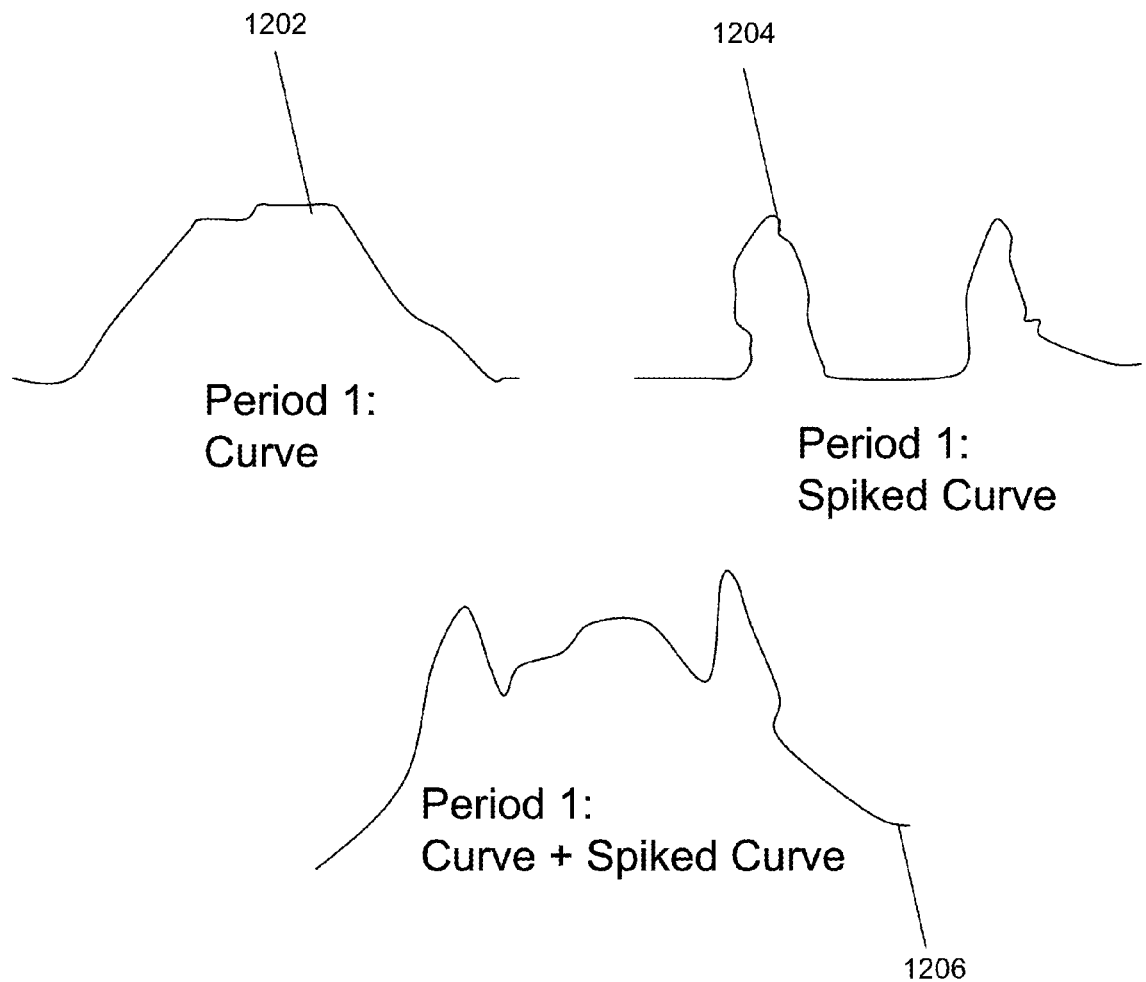
FIG. 12 is an example graphical display of demand in accordance with aspects of the present invention.

FIG. 12 shows example demand curves in accordance with aspects of the present invention. In embodiments, curve 1202 shows a cyclical demand curve for information that is gradual over time (as shown as period 1). In embodiments, a cyclical demand curve can be based on a maximum, minimum, average, log, natural log, and/or any other type of demand forecast. In embodiments, curve 1204 shows a spike demand curve that results in spikes of demand that occur intermittingly over a period of time and then is reduced to a different level of demand during other times. In embodiments, the spike demand curve can be generated by an event forecasting device as described in step 514 in FIG. 5. In embodiments, curve 1204 can have a maximum value which occurs over a shorter period of time than the time period for curve 1202; and curve 1204 can have a maximum value that is greater, equal, or less than the maximum value of curve 1202. For example, between 10:00 a.m. to 10:15 a.m., there is a data demand for 10 megabytes (MB) of information and then only 1 MB of demand for information from 10:15 a.m. until 3:00 p.m. At 3:00 p.m., there is another data demand for 15 MB of information. In embodiments, curve 1206 shows a total predicted demand curve that includes both a cyclical demand as shown in curve 1202 and spikes of demand as shown in curve 1204. In embodiments, the total predicted demand curve can be generated by an event forecasting device as described in step 518 in FIG. 5. Thus, the demand server determines computing device resources based on curve 1206, as further described in step 519 in FIG. 5.

In embodiments, the invention provides a method that performs the process of the invention on a subscription, advertising, and/or fee basis. That is, a service provider, such as a Solution Integrator, could offer to provide network demand forecasting functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for network demand forecasting. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for predicting demand of networked computing resources, comprising:
   generating and testing multiple models comprising a linear model, a quadratic model, and a cubic model for predicting website data demand of an event;
   selecting a reference model with a lowest level of error among the multiple models;
   training the selected reference model by boosting the selected reference model;
   training the selected reference model by bagging the selected reference model;
   selecting one of the boosted selected reference model, the bagged selected reference model, and the selected reference model with the lowest level of error;
   inputting historical information which corresponds to data demand of events similar to the event into the selected one of the boosted selected reference model, the bagged selected reference model, and the selected reference model;
   generating, by at least one computing device, a predicted demand spike curve having a Gaussian distribution using the selected one of the boosted selected reference model, the bagged selected reference model, and the selected reference model and the historical information;
   generating a total predicted demand curve by combining the predicted demand spike curve with predicted cyclical demand;
   provisioning, by the at least one computing device, a plurality of website servers to handle the total predicted demand curve;
   dynamically updating the total predicted demand curve by using updated historical information corresponding to a sliding window of time;
   evaluating an accuracy of the selected one of the boosted selected reference model, the bagged selected reference model, and the selected reference model based on the dynamically updated total predicted demand curve by generating a graph to determine a success level of the selected one of the boosted selected reference model, the bagged selected reference model, and the selected reference model for a specified period of time during the event;
   switching to another model for a next period of time during the event in response to the selected one of the boosted selected reference model, the bagged selected reference model, and the selected reference model not achieving the success level for the specified period of time during the event; and
   provisioning based on the evaluating and the switching, by the at least one computing device, the website servers based on an updated demand curve.

2. The method of claim 1, wherein the selecting the model includes:
   inputting training data into each of the multiple models and comparing a level of error for each of the multiple models.

3. The method of claim 1, wherein the inputting the information into the model further includes inputting online information.

4. The method of claim 3, wherein the predicted demand spike is associated with a sporting event.

5. The method of claim 4, wherein the online information is associated with current demands for content of a website and information retrieved from social networking websites.

6. The method of claim 1, further comprising updating the total predicted demand curve by inputting the historical information and online information.

7. The method of claim 1, further comprising:
   generating an additional model, derived from the selected reference model, such that the additional model includes a weighted variable for time; and
   analyzing the additional model with the weighted variable for time associated with the additional model to determine whether the additional model generates outputs that meet threshold values.

8. The method of claim 7, further comprising:
   replacing the additional model with another additional model when the outputs meet the threshold values; and
   continuing to use the additional model when the outputs do not meet the threshold values.

9. The method of claim 1, wherein the predicted demand spike provides a spike demand value.

10. The method of claim 9, wherein the spike demand value is added to a value associated with the cyclical demand curve.

11. The method of claim 1, wherein a service provider at least one of creates, maintains, deploys and supports a computer infrastructure that includes the at least one computing device.

12. The method of claim 1, wherein steps of claim 1 are provided by a service provider on a subscription, advertising, and/or fee basis.

13. The method of claim 1, wherein the boosting the selected model further comprises amplifying the lowest level of error for the selected model, generating a difference between the amplified level of error and a target value, determining whether the difference is greater than a standard deviation, and back propagating with a Newton-Ralphson method used for determining zero values of a real-valued function.

14. A computer program product for predicting website data demand, the computer program product comprising a computer readable storage medium having program instructions embodied therewith, the program instructions readable/executable by a computing device to cause the computing device to:
   input, by the computing device, online information which corresponds to current data demand of an event into a model for predicting website data demand associated with the event;
   generate, by the computing device, a predicted demand spike curve having a Gaussian distribution using the model;
   generate, by the computing device, a total predicted demand curve by combining the predicted demand spike curve with predicted cyclical demand;
   allocate, by the computing device, computing resources based on the total predicted demand curve;
   dynamically update the total predicted demand curve by using updated online information corresponding to a sliding window of time;
   evaluate an accuracy of the model based on the dynamically updated total predicted demand curve by generating a graph to determine a success level of the model for a specified period of time during the event;
   switching to another model for a next period of time during the event in response to the model not achieving the success level for the specified period of time during the event; and provisioning based on the evaluating and the switching, the computing resources based on an updated demand curve.

15. The computer program product of claim 14, wherein the inputted information further comprises historical information associated with the event.

16. The computer program product of claim 15, wherein the online information is associated with at least one of proximity to lead, featured group, playoffs, and web exclusive events associated with the event.

17. The computer program product of claim 16, wherein the online information is retrieved from servers associated with social networking websites.

18. The computer program product of claim 14, wherein the model is one of a linear model, a quadratic model, and a cubic model.

19. The computer program product of claim 14, wherein the model is selected from multiple models based on the model having a highest level of accuracy among the multiple models.

20. A system for predicting demand of networked computing resources, comprising:
- a CPU, a computer readable memory and a computer readable storage medium;
- program instructions to select a reference model from multiple models comprising a linear model, a quadratic model, and a cubic model based on the selected reference model having a lowest level of error among the multiple models;
- program instructions to train the selected reference model by boosting the selected reference model;
- program instructions to train the selected referenced model by bagging the selected reference model;
- program instructions to select one of the boosted selected referenced model, the bagged selected reference model, and the selected reference model with the lowest level of error;
- program instructions to input information into the selected one of the boosted selected referenced model, the bagged selected reference model, and the selected reference model, wherein the information is historical information which corresponds to data demand of events similar to an event and online information which corresponds to current data demand of the event associated with the event that generates website data demand;
- program instructions to generate a predicted demand spike curve having a Gaussian distribution using the selected one of the boosted selected referenced model, the bagged selected reference model, and the selected reference model;
- program instructions to generate a total predicted demand curve by combining the predicted demand spike curve with predicted cyclical demand;
- program instructions to allocate computing resources based on the total predicted demand curve;
- program instructions to dynamically update the total predicted demand curve by using updated historical information and updated online information corresponding to a sliding window of time;
- program instructions to evaluate an accuracy of the selected one of the boosted selected referenced model, the bagged selected reference model, and the selected reference model based on the dynamically updated total predicted demand curve by generating a graph to determine a success level of the selected one of the boosted selected referenced model, the bagged selected reference model, and the selected reference model for a specified period of time during the event;
- program instructions to switch to another model for a next period of time during the event in response to the selected one of the boosted selected reference model, the bagged selected reference model, and the selected reference model not achieving the success level for the specified period of time during the event; and
- program instructions to provision based on the evaluating and the switching, the computing resources based on an updated demand curve, wherein the program instructions are stored on the computer readable storage medium for execution by the CPU via the computer readable memory.

* * * * *